(12) United States Patent
Akhavan Fomani et al.

(10) Patent No.: US 9,201,592 B2
(45) Date of Patent: Dec. 1, 2015

(54) METHODS AND DEVICES FOR PROVIDING INTELLIGENT PREDICTIVE INPUT FOR HANDWRITTEN TEXT

(71) Applicant: BlackBerry Limited, Waterloo (CA)

(72) Inventors: Armin Akhavan Fomani, Toronto (CA); Cornel Mercea, Waterloo (CA); Son Trung Huynh, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 194 days.

(21) Appl. No.: 13/963,719

(22) Filed: Aug. 9, 2013

(65) Prior Publication Data

US 2015/0043824 A1 Feb. 12, 2015

(51) Int. Cl.
| | |
|---|---|
| G06K 9/00 | (2006.01) |
| G06F 3/0488 | (2013.01) |
| G06F 3/023 | (2006.01) |
| G06F 17/27 | (2006.01) |

(52) U.S. Cl.
CPC .......... *G06F 3/04883* (2013.01); *G06F 3/0237* (2013.01); *G06F 17/276* (2013.01)

(58) Field of Classification Search
None
See application file for complete search history.

(56) References Cited

U.S. PATENT DOCUMENTS

| | | | |
|---|---|---|---|
| 5,724,457 A * | 3/1998 | Fukushima | 382/311 |
| 6,094,197 A | 7/2000 | Buxton et al. | |
| 6,256,410 B1 * | 7/2001 | Nathan et al. | 382/187 |
| 6,661,409 B2 | 12/2003 | Demartines et al. | |
| 6,816,859 B2 | 11/2004 | Goldberg et al. | |
| 7,234,119 B2 | 6/2007 | Wu et al. | |
| 7,292,226 B2 | 11/2007 | Matsuura et al. | |
| 7,561,740 B2 * | 7/2009 | Denoue et al. | 382/187 |
| 7,734,094 B2 * | 6/2010 | Revow | 382/189 |
| 8,411,958 B2 | 4/2013 | Rieman | |
| 2003/0193478 A1 * | 10/2003 | Ng et al. | 345/168 |
| 2005/0017954 A1 * | 1/2005 | Kay et al. | 345/169 |
| 2005/0222848 A1 * | 10/2005 | Napper et al. | 705/1 |
| 2006/0217953 A1 * | 9/2006 | Parikh | 704/1 |
| 2007/0079239 A1 * | 4/2007 | Ghassabian | 715/707 |
| 2008/0056578 A1 * | 3/2008 | Shilman et al. | 382/186 |
| 2008/0143692 A1 | 6/2008 | Borgaonkar | |
| 2009/0249258 A1 | 10/2009 | Tang | |
| 2009/0279782 A1 * | 11/2009 | Wu | 382/189 |
| 2009/0295737 A1 | 12/2009 | Goldsmith et al. | |
| 2009/0297028 A1 * | 12/2009 | De Haan | 382/187 |
| 2010/0122164 A1 * | 5/2010 | Kay et al. | 715/708 |
| 2011/0184736 A1 * | 7/2011 | Slotznick | 704/249 |
| 2012/0216141 A1 | 8/2012 | Li | |
| 2013/0024185 A1 * | 1/2013 | Parikh | 704/9 |
| 2013/0063357 A1 | 3/2013 | Lee et al. | |
| 2014/0160032 A1 * | 6/2014 | Che et al. | 345/173 |

(Continued)

FOREIGN PATENT DOCUMENTS

EP 2088536 A1 12/2009

*Primary Examiner* — Aaron W Carter
(74) *Attorney, Agent, or Firm* — Fish & Richardson P.C.

(57) ABSTRACT

A computer-implemented method for use in an electronic device includes receiving a first handwritten input comprising at least one handwritten character, and obtaining a plurality of candidate words that correspond to at the least one handwritten character. A first electronic instruction is generated to display information identifying one or more of the candidate words on a display of the electronic device. A second handwritten input indicative of a selection of one or the displayed candidate words is received, and a second electronic instruction is generated to display the selected candidate word on the display of the electronic device.

21 Claims, 14 Drawing Sheets

(56) References Cited

U.S. PATENT DOCUMENTS

| | | |
|---|---|---|
| 2015/0043824 A1 * | 2/2015 | Akhavan Fomani et al. . 382/188 |
| 2015/0058718 A1 * | 2/2015 | Kim et al. .................. 715/268 |
| 2015/0135065 A1 * | 5/2015 | Hirabayashi et al. ......... 715/261 |
| 2015/0154176 A1 * | 6/2015 | Tasaki et al. ................. 715/261 |

\* cited by examiner

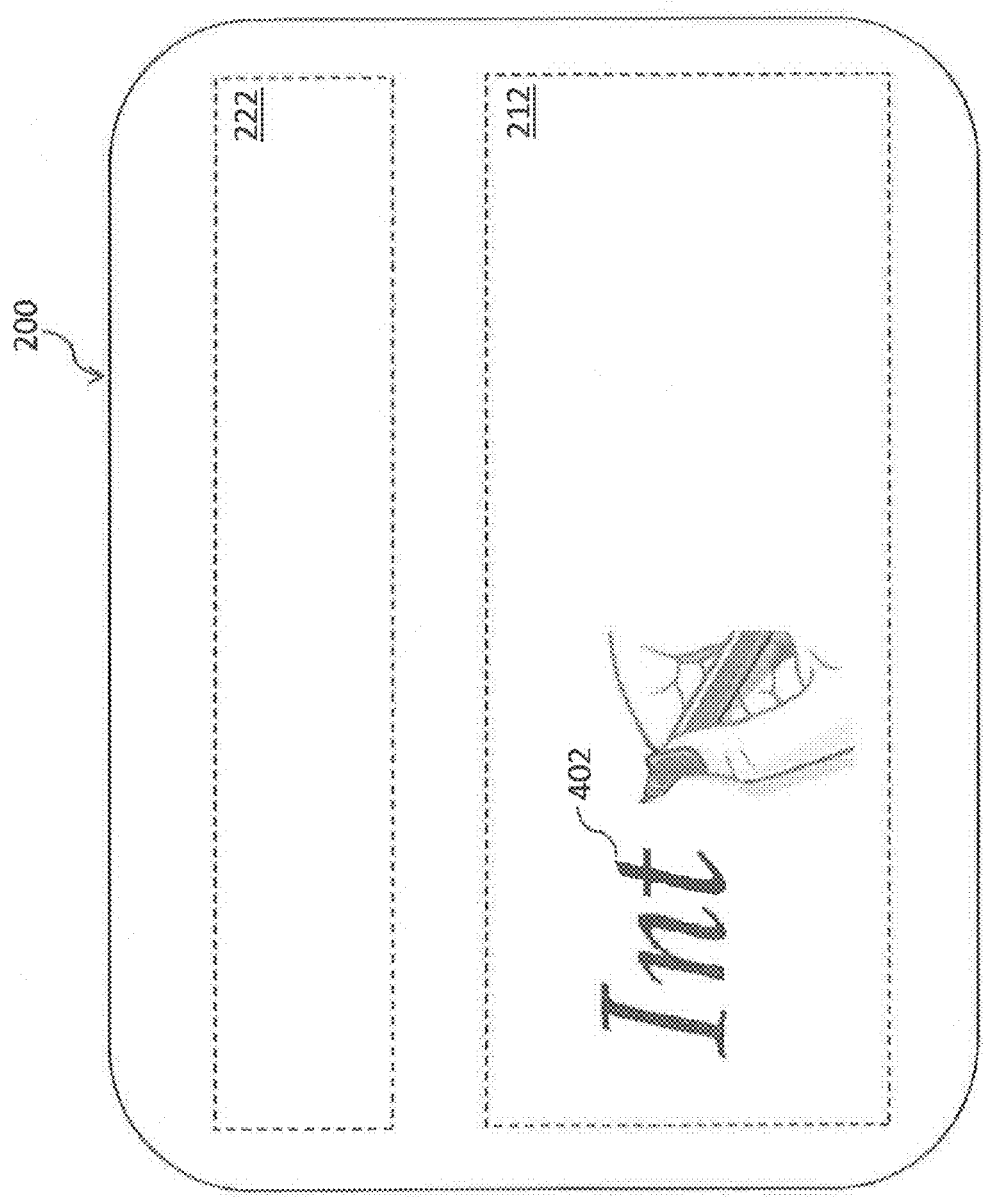

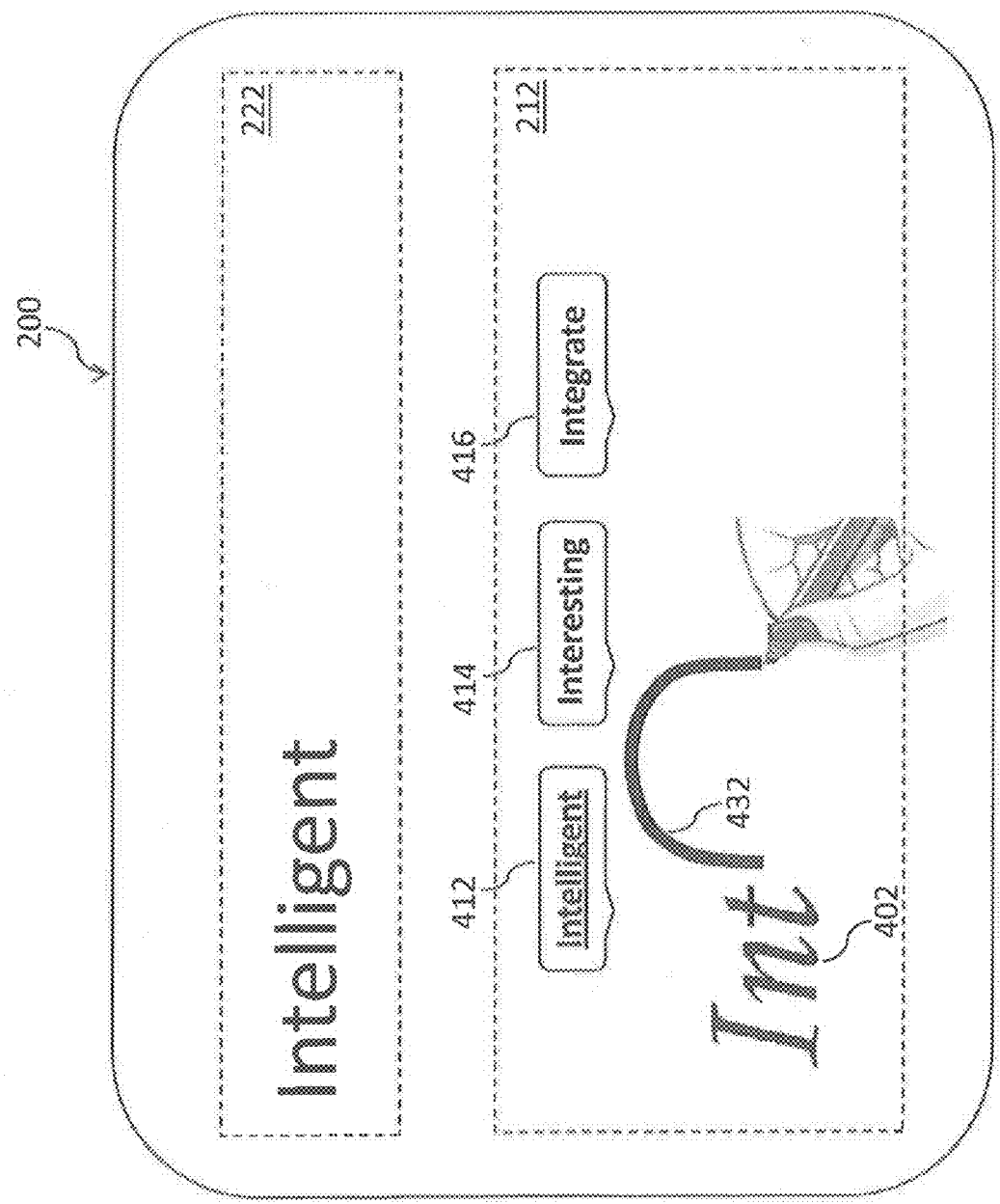

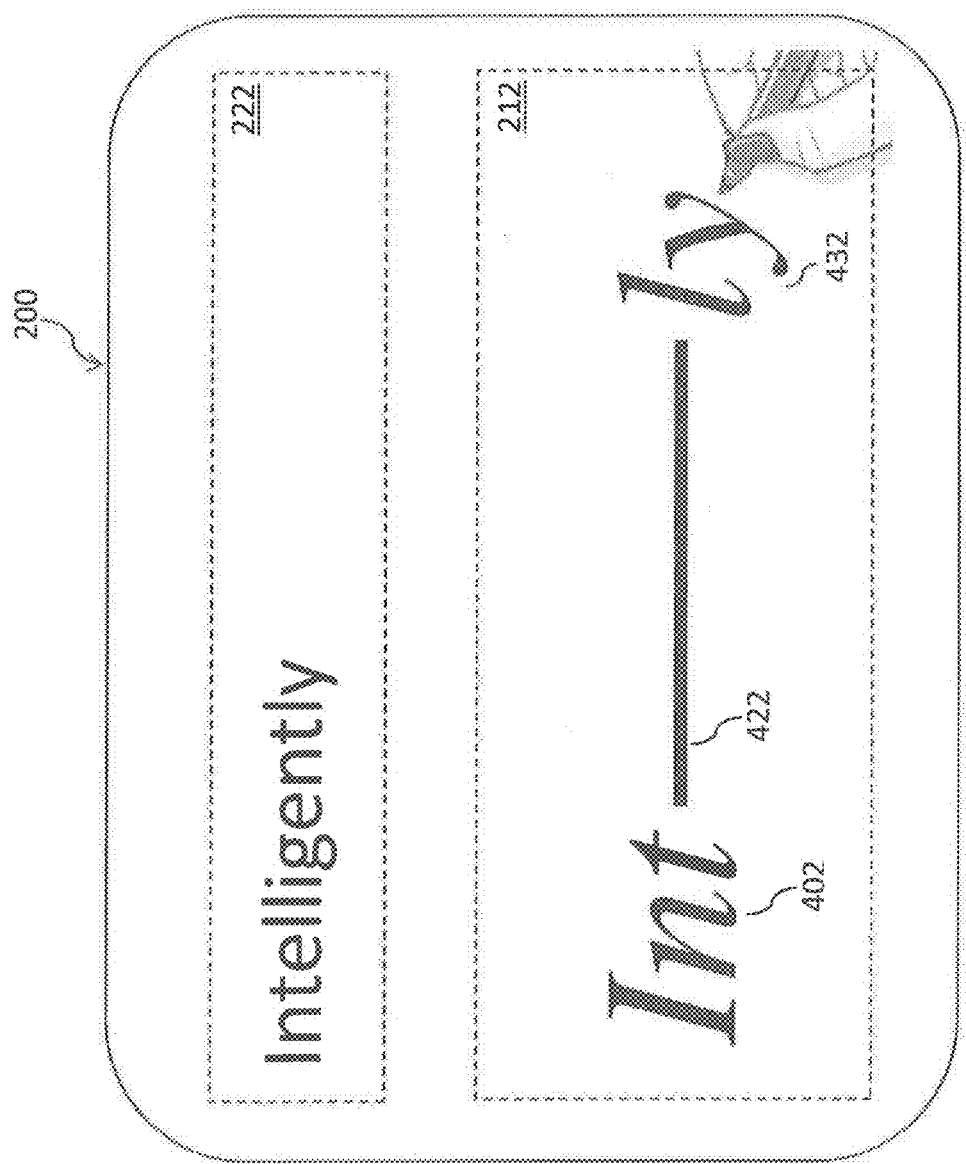

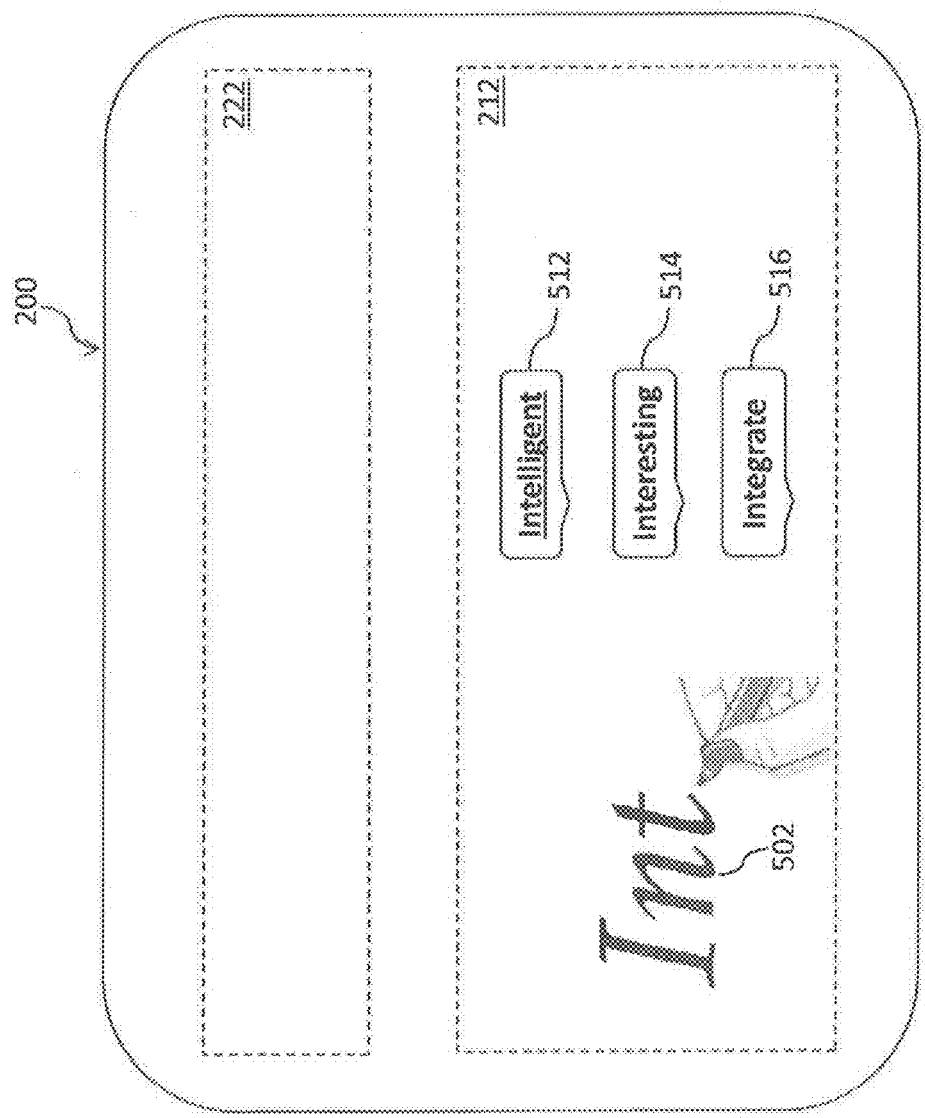

METHODS AND DEVICES FOR PROVIDING INTELLIGENT PREDICTIVE INPUT FOR HANDWRITTEN TEXT

FIELD

This application generally relates to methods and devices for providing a text prediction based on handwritten characters.

BACKGROUND

Increasingly, electronic devices, such as computers, laptops, netbooks, cellular phones, smart phones, personal digital assistants, tablets, etc., include touch-sensitive display screens (e.g., touchscreens) that allow a user to input handwritten characters and shapes using a stylus or a fingertip, which are converted into text strings and input into various application programs, such as word processor or e-mail applications. The entry of handwritten characters in touchscreen can, however, represent a cumbersome and inefficient task due to, for example, a size of the touchscreen, especially when the user must input large numbers of handwritten characters in short time periods.

BRIEF DESCRIPTION OF THE DRAWINGS

FIGS. 4A-4G illustrate example graphical user interfaces that provide intelligent predictive input for handwritten text, according to an example embodiment.

FIGS. 5A-5C illustrate example graphical user interfaces that provide intelligent predictive input for handwritten text, according to another example embodiment.

DETAILED DESCRIPTION

Reference will now be made in detail to the disclosed example embodiments, which are illustrated in the accompanying drawings. Wherever possible, the same reference numbers will be used throughout the drawings to refer to the same or like parts.

The present disclosure relates to an electronic device, such as a wired communication device, e.g., a laptop computer, or a wireless communication device such as a cellular phone, smartphone, wireless organizer, personal digital assistant, gaming console, netbook, wirelessly enabled notebook computer, tablet computer, or a similar device. The electronic device can also be an electronic device without wireless communication capabilities, including a handheld electronic game device, display such as a liquid crystal display (LCD), digital photograph album, digital camera, a personal computer, or other similar devices.

Predictive solutions are provided to assist with handwritten input on electronic devices during word entry or editing operations. These solutions include predicting, based on a threshold number of handwritten characters, one or more candidate words that could represent a user's intention when entering the handwritten characters, and facilitating the user's selection of one of the predicted candidate words to complete the handwritten characters. In some embodiments, a subset of the predicted candidate words is displayed in an interface with visual indications of corresponding rankings, and the user selects one of the predicted candidate words by entering non-character handwritten input, e.g., a line striking through at least a portion of the interface, or a line that leaps over a portion of the interface. Further, in some embodiments, the user enters additional handwritten characters after selecting one of the predicted candidate words, and the additional handwritten characters are appended to the selected candidate word as a suffix, a punctuation mark, or the like. In this way, embodiments consistent with this disclosure overcome the shortcomings associated with touchscreen input processing and facilitates the quick and accurate input of words and portions of words in electronic devices.

Figure 1:
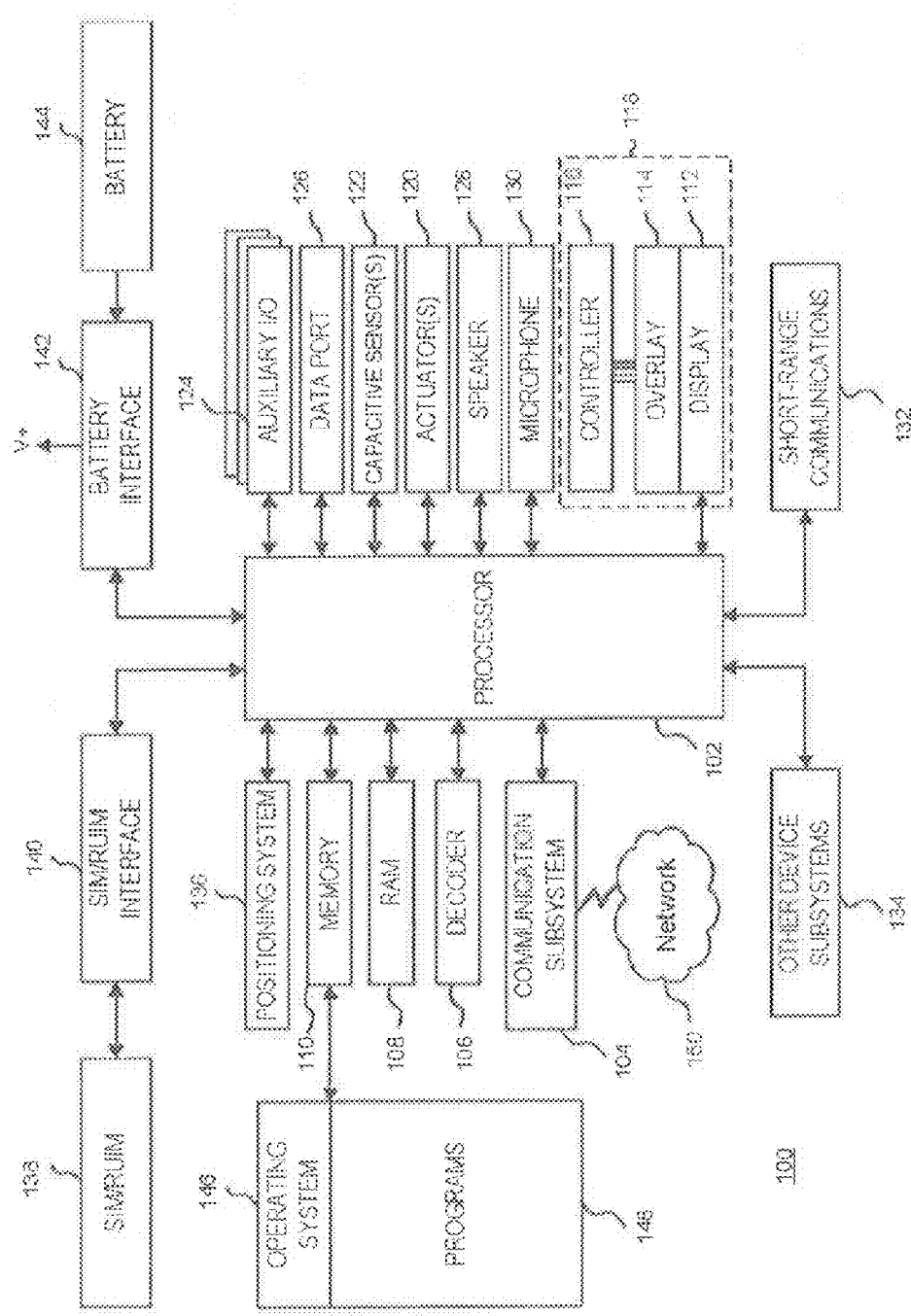
FIG. 1 is a block diagram of an electronic device, according to an example embodiment.

FIG. 1 is a block diagram of an electronic device 100, according to an example embodiment. Electronic device 100 includes multiple components, such as a processor 102 that controls the overall operation of electronic device 100. Communication functions, including data and voice communications, are performed through an optional communication subsystem 104. Data received by electronic device 100 is decompressed and decrypted by a decoder 106. Communication subsystem 104 receives messages from and sends messages to a network 150. Network 150 is any type of network, including, but not limited to, a wired network, a data wireless network, a voice wireless network, or a dual-mode wireless network that supports both voice and data communications. In some embodiments, electronic device 100 is a battery-powered device, in which case it includes a battery interface 142 for receiving one or more batteries 144.

Processor 102 is coupled to and can interact with additional subsystems such as a Random Access Memory (RAM) 108; a memory 110, such as a hard drive, CD, DVD, flash memory, or a similar storage device; one or more actuators 120; one or more capacitive sensors 122; an auxiliary input/output (I/O) subsystem 124; a data port 126; a speaker 128; a microphone 130; a short-range communications subsystem 132; other device subsystems 134; and a touchscreen 118.

Touchscreen 118 includes a display 112 with a touch-active overlay 114 (or other similar touch input interface) connected to a controller 116. User interaction with a graphical user interface (GUI), such as a virtual keyboard rendered on display 112 for input of characters, an interface having regions for entry and display of handwritten characters and shapes, or a web browser, is performed through touch-active overlay 114. Processor 102 interacts with touch-active overlay 114 via controller 116. Characters, such as text, symbols, images, and other items are displayed on display 112 of touchscreen 118 via processor 102. Characters are input into electronic device 100 using a keyboard (not shown in FIG. 1), such as a physical keyboard having keys that are mechanically actuated, or a virtual keyboard having keys displayed on display 112.

Touchscreen 118 is connected to and controlled by processor 102. Accordingly, detection of a touch event and determining the location of the touch event is performed by processor 102 of electronic device 100. A touch event includes, for example, a tap by a finger, a swipe by a finger, a swipe by a stylus, a long press by finger or stylus, or a press by a finger for a predetermined period of time, and the like.

Further, processor 102, in conjunction with touch-active overlay 114 and controller 112, detects handwritten characters and geometric shapes drawn onto a surface of touchscreen 118 by a stylus or human appendage, e.g., a human finger. By way of example, processor 102 detects an initial location of contact between the stylus or finger and the surface of touchscreen 118, and detects subsequent locations of the stylus or finger as the user draws the characters and geometric shapes on the surface of touchscreen 118. Handwritten characters consistent with the disclosed embodiments include, but are not limited to, Arabic numerals, Latin characters, Chinese characters, Japanese characters, Hebrew characters, Greek characters, Cyrillic characters, and the like. Further, handwritten geometric shapes consistent with the disclosed embodiments include, but are not limited to, lines, circles, semi-circles, and the like.

As an alternate to entering text via a virtual keyboard rendered on display 112, processor 102 can perform image recognition to convert handwritten characters into corresponding text strings, and further, to identify one or more predetermined shapes that can be associated with corresponding outcomes (e.g., a selection of an item displayed within the GUI). Processor 102 can then instruct controller 116 to display combinations of the corresponding text string and the identified shape within one or more portions of the GUI.

While specific embodiments of a touchscreen are described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Processor 102 also, in some embodiments, interacts with a positioning system 136 for determining a location of electronic device 100. The location is determined in any number of ways, such as by a computer, by a Global Positioning System (GPS), either included or not included in electric device 100, through a Wi-Fi network, or by having a location entered manually. Additionally, or alternatively, the location is determined based on calendar entries.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by processor 102 and are typically stored in memory 110. Additional applications can be loaded onto electronic device 100 through network 150, auxiliary I/O subsystem 124, data port 126, short-range communications subsystem 132, or any other suitable subsystem.

A received signal such as a text message, an e-mail message, an instant message, or a web page download is processed by communication subsystem 104 and this processed information is then provided to processor 102. Processor 102 processes the received signal for output to display 112, to auxiliary I/O subsystem 124, or a combination of both. A user can compose data items, for example, e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2:
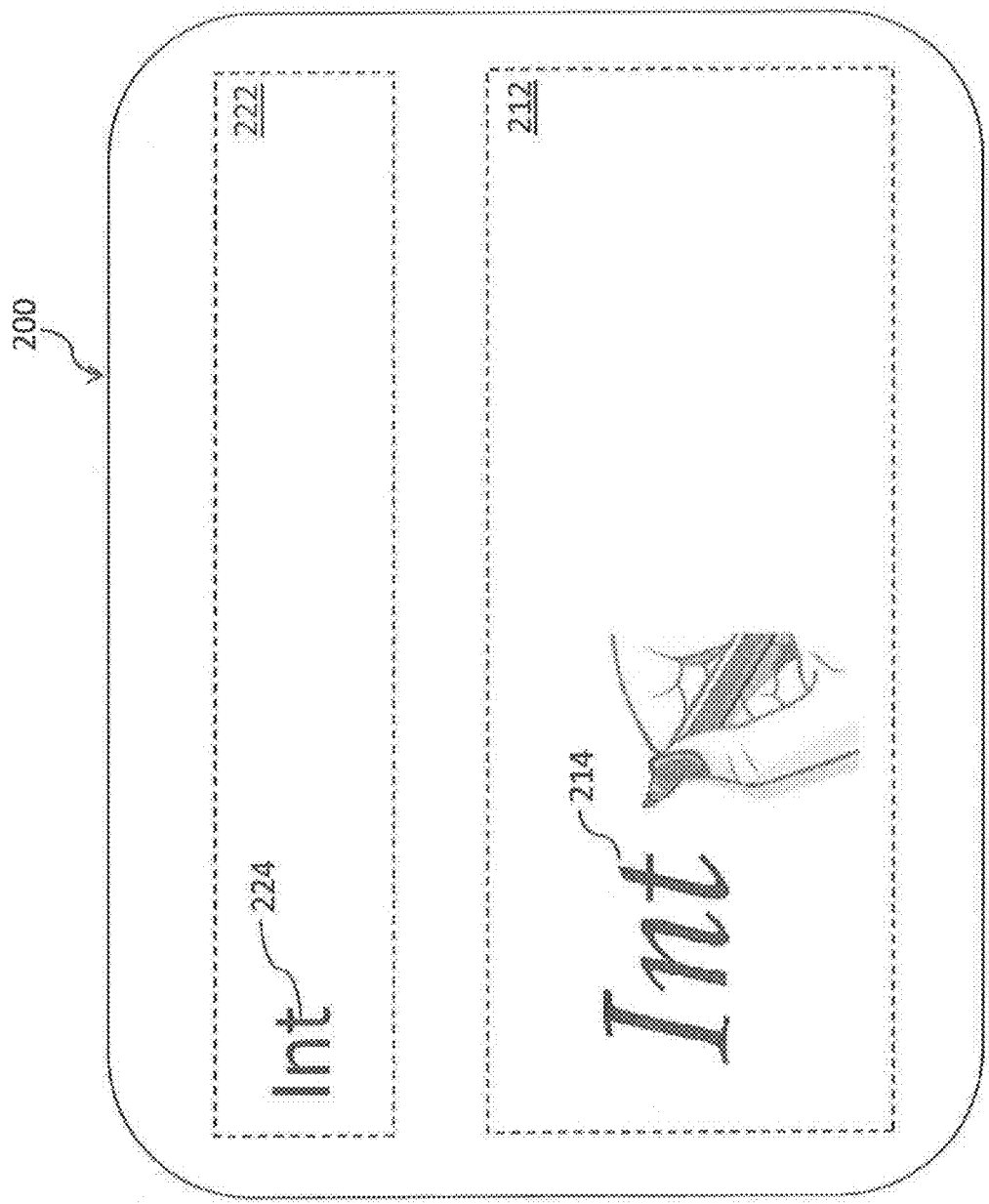
FIG. 2 shows illustrates a graphical user interface, according to an example embodiment.

FIG. 2 illustrates an example of a graphical user interface (GUI) 200, in accordance with an example embodiment. For example, processor 102 of electronic device 100 can display GUI 200 on display 112 of touchscreen 118, and subsequently interact with controller 116 and touch-active overlay 114 to detect characters and geometric shapes drawn onto a surface of touchscreen 118 using a stylus or a human appendage (e.g., a finger).

GUI 200 in FIG. 2 includes a text input region 212 and a text display region 222. In this example GUI 200, regions 212 and 222 are separate and adjacent. Alternatively, regions 212 and 222 may coincide or overlap in whole or in part.

In an embodiment, a user draws characters into text input region 212 using a human finger or a stylus, and processor 102 performs image recognition to identify a text string corresponding to the drawn characters. Processor 102 then generates one or more electronic instructions to display the identified text string within text display region 222. Similarly, processor 102 performs image recognition on the handwritten geometric shapes to identify one or more predetermined shapes (e.g., a "strikethrough" input and a "leaping" input) that correlate with specific, predetermined outcomes (e.g., the selection of highly-ranked candidate words).

In an example embodiment, the user draws handwritten characters 214 (i.e., "I-n-t") within text input region 212 using a stylus or finger. Processor 102 then performs image recognition on the handwritten characters to identify a text string that includes the characters "I-n-t," and then generates one or more electronic instructions to display characters 224 of the identified text string within text display region 222, as illustrated in FIG. 2.

Figure 3:
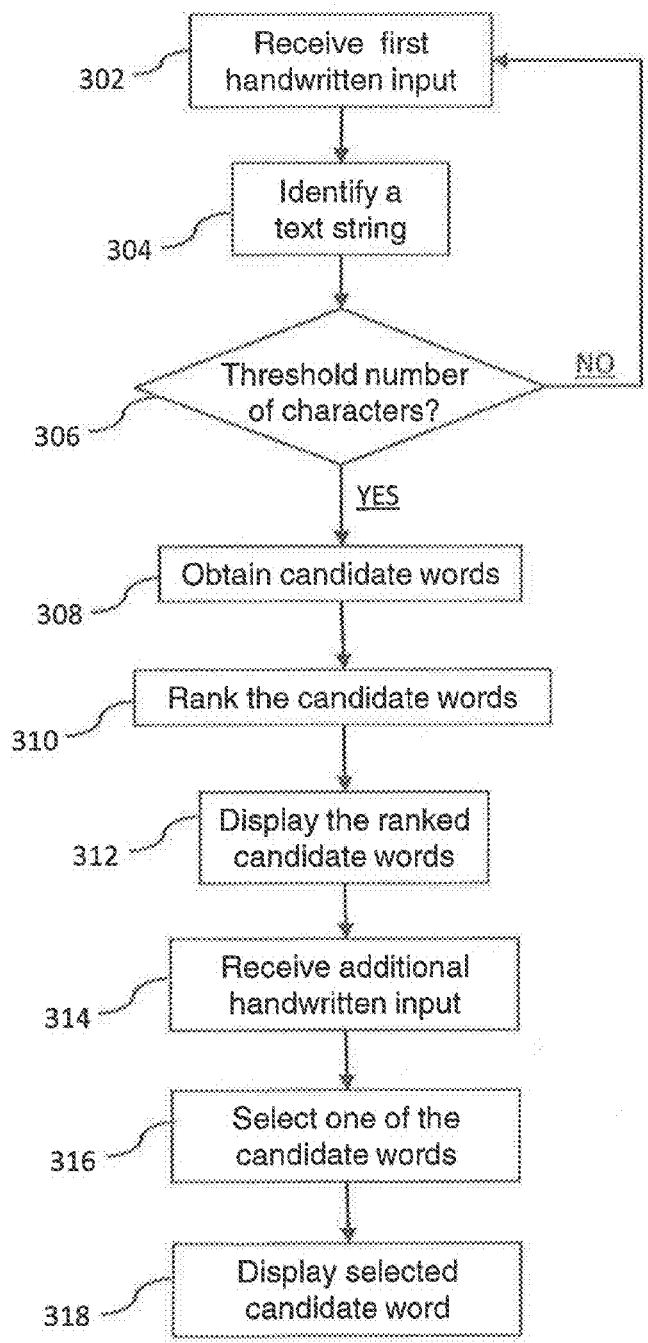
FIG. 3 is a flowchart illustrating a method for providing intelligent predictive input for handwritten text, according to an example embodiment.

FIG. 3 is a flowchart of example method 300 for providing intelligent predictive input for handwritten text, according to an example embodiment. Example method 300 provides functionality that, in an embodiment, enables processor 102 of electronic device 100 to receive a first handwritten input, to obtain and rank candidate words that correspond to at least a portion of the first handwritten input, and further, to select one of the candidate words to complete the first handwritten input based on an additional handwritten input received from a user.

In FIG. 3, processor 102 receives a first handwritten input in step 302. The first handwritten input includes, for example, image data associated with one or more handwritten characters drawn onto a surface of touchscreen 118 using a stylus or human finger. In such an embodiment, processor 102 can coordinate with controller 116 and touch-active overlay 114 to detect the entry of the first handwritten input and to capture the image data associated with the first handwritten input.

In step 304, processor 102 identifies a text string representative of the first handwritten input. In an embodiment, processor 102 executes one or more stored computer programs (e.g., programs 148 in memory 110 of FIG. 1) to perform image recognition on the image data associated of the first handwritten input to identify the corresponding text string. Processor 102 can, in such embodiments, then generate instructions to display the identified text string within a portion of a graphical user interface (GUI) presented by display 112 of touchscreen 118 (e.g., GUI 200 of FIG. 2).

Processor 102 then determines in step 306 whether the text string includes at least a threshold number of characters. For example, the threshold number of characters can include one character, two characters, three characters, or any additional or alternate number of characters appropriate for the first handwritten input and electronic device 100.

If processor 102 determines in step 306 that the identified text string fails to include the threshold number of characters, then example method 300 passes back to step 302, and processor 102 awaits additional handwritten input. If, however, processor 102 determines that the identified text string includes at least the threshold number of characters, then processor 102 obtains one or more candidate words having a relationship with at least a portion of the identified text string in step 308, and further, that could represent the user's intention when entering the handwritten input. By way of example, the candidate words can include, but are not limited to, individual words, compound words, phrases, acronyms, names, slang, colloquialisms, abbreviations, or any combination thereof.

In an embodiment, the obtained candidate words include at least a portion of the identified text string with corresponding text substrings. By way of example, for an identified text string including the characters "I-n-t", processor 102 obtains candidate words that include "Interesting," "Intelligent," and "Integrate." Furthermore, processor 102 also obtains character words that include "It" and "Iterate," as these candidate words include at least a portion of the characters "I-n-t."

In some implementations, processor 102 also utilizes contextual data to obtain the candidate words in step 308. Such contextual data includes, but is not limited to, information about previously inputted character strings (i.e., historical usage data), grammatical attributes of the inputted text (e.g., whether a noun or a verb is needed in a sentence), or any combination thereof. For example, processor 102 can leverage the contextual data to identify and adaptive correct errors within the identified text string, and additionally or alternatively, within the first handwritten input.

In other embodiments, processor 102 receives the candidate words from an additional component of electronic device 100, or alternatively, from a component disposed remotely from and in communication with electronic device 100. For example, processor 102 can be communicatively coupled to a prediction processor (not depicted in FIG. 1), and processor 102 can provide the identified text string to the prediction processor in step 308. The prediction processor can then generate the candidate words based on the identified text string, and provide the generated candidate words to processor 102. In such embodiments, the prediction processor can be a software- or hardware-based module communicatively coupled to processor 102, and can be either local or remote to electronic device 100 (e.g., disposed at a server in communication with electronic device 100 using various communications protocols).

Referring back to FIG. 3, processor 102 assigns rankings to the obtained candidate words in step 310. For example, the assigned rankings can reflect a likelihood that a user might have intended to enter a particular candidate word when providing the first handwritten input, or alternatively, a likelihood that the user might choose the particular candidate word to complete a word partially formed by the first handwritten input. Further, in an embodiment, the assigned rankings can influence a determination of which character strings to display to a user within the GUI.

In an embodiment, processor 102 can assign rankings to the candidate words based on contextual information associated with at least one of the user or electronic device 100. Such contextual data can include, but is not limited to, information identifying one or more programs or applications are currently running or in use by a user, a geographic location of the user, demographic data associated with the user, or combinations thereof.

For example, if the user executes an e-mail application on electronic device 100, sets of characters associated with that user's e-mail system (e.g., from the user's contact list or address book) can be used to assign a ranking to the candidate words. In such an embodiment, processor 102 can assign higher rankings to candidate words that correspond to proper nouns found in the user's contact list (e.g., names such as "Benjamin" and "Christine") relative to, for example, candidate words that correspond to pronouns (e.g., "him" and "her"). In such embodiments, the ranking strategy can be based on a presumption that the user frequently inputs such proper nouns into text messages and emails.

In some implementations, processor 102 also leverages a geographic location associated with the user or the electronic device to assign ranks to the candidate words. By way of example, if electronic device 100 recognizes that the user is located at a workplace, then processor 102 can assign higher rankings to candidate words related to work topics that assigned to candidate words more closely associated with leisure activities. Conversely, for example, if the electronic device 100 determines that a user is away from the office (e.g., at an amusement park or shopping mall), then the processor 102 can assign higher rankings to sets of characters generally related to leisure activities.

In some implementations, the contextual data also includes information associated with text previously entered by the user. For example, processor 102 can assign rankings to the candidate words based on the a frequency of word usage (e.g., commonly-used words can be assigned higher rankings than lesser-used words) or similarities in lengths of previously entered words (e.g., a candidate word having a length similar to previously entered words can be assigned higher ranking than a candidate word having a length that diverges sharply from previously entered words). Further, for example, processor 102 can determine a part of speech associated with a previously entered word, and can determine a ranking for a subsequent word based on the determined part of speech (e.g., if the previously entered word were an adjective, a subsequent noun would be assigned a higher ranking than a subsequent verb).

Referring back to FIG. 3, and in step 312, processor 102 generates one or more electronic instructions to display information identifying at least one of the ranked candidate words within a portion of the GUI (e.g., text input region 202 of FIG. 2). By way of example, the displayed candidate words can be disposed at spatial positions proximate to the handwritten characters within the GUI (e.g., handwritten characters 214 of FIG. 2), and can be arranged along a longitudinal axis of display 112 or alternatively, along a transverse axis of display 112.

In an embodiment, processor 102 selects candidate words for display within the GUI based on the assigned rankings. For example, processor 102 can access a ranked list of the candidate words (e.g., as generated in step 310), and can subsequently select a predetermined number of the highest-ranked candidate words for display in step 312. The predetermined number can include, for example, one word, two words, three words, and the like, and can be varied by a user of electronic device 100 or by processor 102 in accordance with a display setting of the GUI.

Further, in an embodiment, the candidate words can be displayed in the GUI along with a visual indication of their corresponding rankings. For example, the GUI can display a list of the candidate words ordered in accordance with their rankings. Additionally or alternatively, the candidate word associated with a maximum rank can be highlighted to the user within the GUI. For example, information identifying the highest-ranking candidate word can be of a color different from information identifying the other candidate words within the GUI, or alternatively, the information identifying the highest-ranking candidate word within the GUI displayed can be bolded, underlined, or highlighted using any of a number of additional visual effects that identify the highest-ranking candidate word to the user.

Upon presentation of the ranked candidate words in step 312, the user can provide additional handwritten input to indicate a selection of one of the displayed candidate words (e.g., to complete a portion of a word corresponding to the characters of the first handwritten input). For example, the user can select one of the displayed candidate words by tapping on a region of the GUI corresponding to the selected candidate word using a finger or stylus, or by pressing a finger or a stylus on one the region of the GUI for a predetermined period of time.

Alternatively, the additional handwritten input can indicate the user's selection of the highest-ranking candidate word. For example, the user can select the highest-ranking candidate word by drawing a line across a text input region of the GUI without releasing contact with a surface of touchscreen 118 (i.e., a "strikethrough" input), or alternatively, by using a finger or a stylus to outline a semi-circular shape that "leaps" across a portion of the text input region (i.e., a "leaping" input). In such embodiments, the additional handwritten input enables the user to rapidly and efficient completely words associated with the handwritten characters.

Referring back to FIG. 3, processor 102 receives information identifying the additional handwritten input in step 314, and subsequently identifies the candidate word corresponding to the user's selection in step 316. For example, processor 102 determines in step 314 that additional handwritten input represents a "touch event" indicative of a selection of a corresponding one of the displayed candidate words (e.g., (e.g., a tap or press by a finger or stylus at a spatial position within display 112 associated with the corresponding one of the displayed candidate words). Further, by way of the example, processor 102 can determine that the additional handwritten input corresponds to a "strikethrough" or a "leaping" input that indicates the user's selection of the highest-ranking candidate word.

Processor 102 can then display the identified candidate word, which corresponds to the user's selection, within display 112 in step 318. By way of example, processor 102 can display the identified candidate word within a corresponding text display region of the GUI (e.g., text display region 222 of FIG. 2), and the user can then continue to enter handwritten text within a corresponding text entry region of the GUI (e.g., text entry region 212 of in step 31).

Upon selection of the candidate word, the user can, in an embodiment, draw additional characters and geometric shapes within the text entry region of the GUI (e.g., text entry region 212 of FIG. 2). For example, the additional characters can represent a portion of a newly entered word, and in such an embodiment, processor 102 can provide the user with one or more ranked candidate words and facilitate the user's selection of one of the candidate words to complete the portion of the newly entered word, as described above in reference to FIG. 3. The disclosed embodiments are, however, not limited to the entry of additional characters directed to new words, and in further embodiments, the user can intend to augment the selected candidate word with the additional handwritten characters.

For example, the user can draw one or more characters within text input region 212, and then indicate a selection of a highest-ranking candidate word by drawing a line through text entry region 212, as described above. Without breaking contact between the surface of touchscreen 118 and the finger or stylus for a predetermined time, the user can enter additional characters into the text entry region 212 of the GUI, and processor 102 can then append the additional characters to the selected candidate word without a corresponding intervening space. Such additional characters can, for example, represent a suffix (e.g., "-ly," "-ing," "-ed," and the like) or a punctuation mark (e.g., a comma or period).

Using the embodiments described above, a user of electronic device 100 can enter handwritten characters forming a portion of a word within a graphical user interface (GUI), and can subsequently select candidate words using handwritten input to complete the word. FIGS. 4A-4G illustrate examples of a graphical user interface (GUI) 200 that enables a user to enter handwritten characters in a text entry region 212, and to select a highest-ranked candidate word based on a subsequent handwritten input, in accordance with an example embodiment.

In FIG. 4A, a user enters the characters 402 into a text entry region 212 of a graphical user interface (GUI) 200 using a stylus (or alternatively, a finger). As described above, processor 102 of electronic device 102 receives the handwritten input, identifies a text string corresponding to characters 402, determines that the identified text string includes a threshold number of characters, and then obtains ranked candidate words that correspond to the identified text string.

For example, the identified text string includes the characters "I-n-t," and processor 102 can then obtain candidate words "Intelligent," "Interesting," and "Integrate" that correspond to the identified text string and could represent the user's intention when entering the handwritten characters. Processor 102 can then determine a ranking for each of the candidate words (e.g., based on a prior history or use, contextual information, or demographic information). For example, processor 102 can determine that candidate word "Intelligent" is associated with a maximum of the rankings assigned to the obtained candidate words. Processor 102 can then display the ranked candidate words within text input region 212 of GUI 200, along with visual indications of the corresponding rankings, as illustrated in FIG. 4B.

Figure 4B:
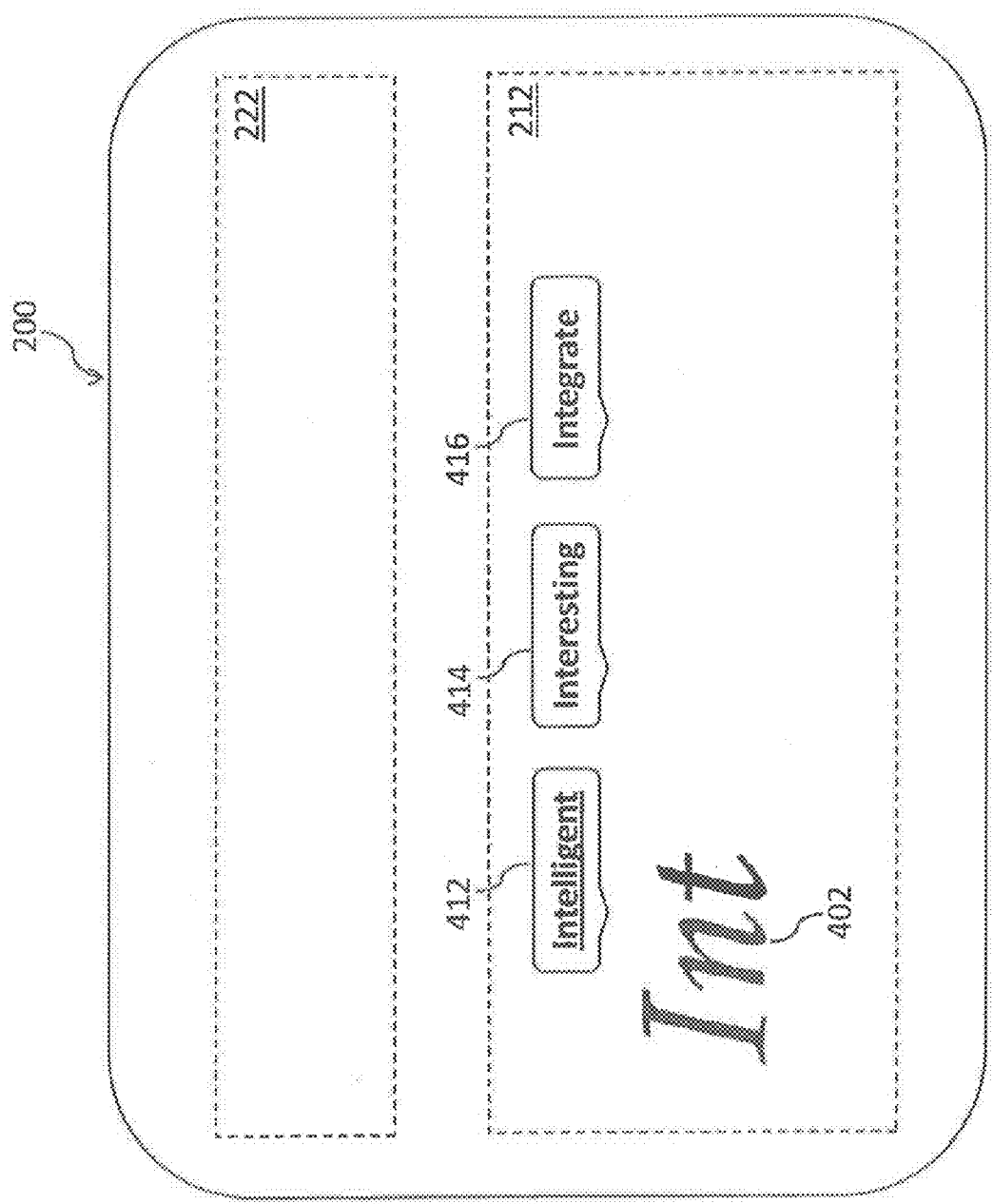

In FIG. 4B, candidate words 412, 414, and 416 are disposed proximate to characters 402 within text entry region 212 of GUI 200. For example, candidate words 412, 414, and 416 can be arranged in order of their corresponding rankings along a longitudinal axis of GUI 200, with a ranking assigned to "Intelligent" (i.e., candidate word 412) exceeding a ranking assigned to "Interesting" (i.e., candidate word 414) and a ranking assigned to "Integrate" (i.e., candidate word 416). Further, as illustrated in FIG. 4B, candidate word 412 is highlighted via underlining, indicating that "Intelligent" is associated with a maximum of the assigned rankings.

As described above, the user can select candidate word 412 by tapping the stylus (or a finger) in a region of GUI 200 associated with candidate word 412, or alternatively, the user can press the stylus within the region of GUI 200 associated with candidate word 412 for a predetermined time period. Further, in an additional embodiment, the user can leverage an optical navigation module communicatively coupled to processor 102 to select of one of candidate words 412, 414, or 416.

Figure 4C:
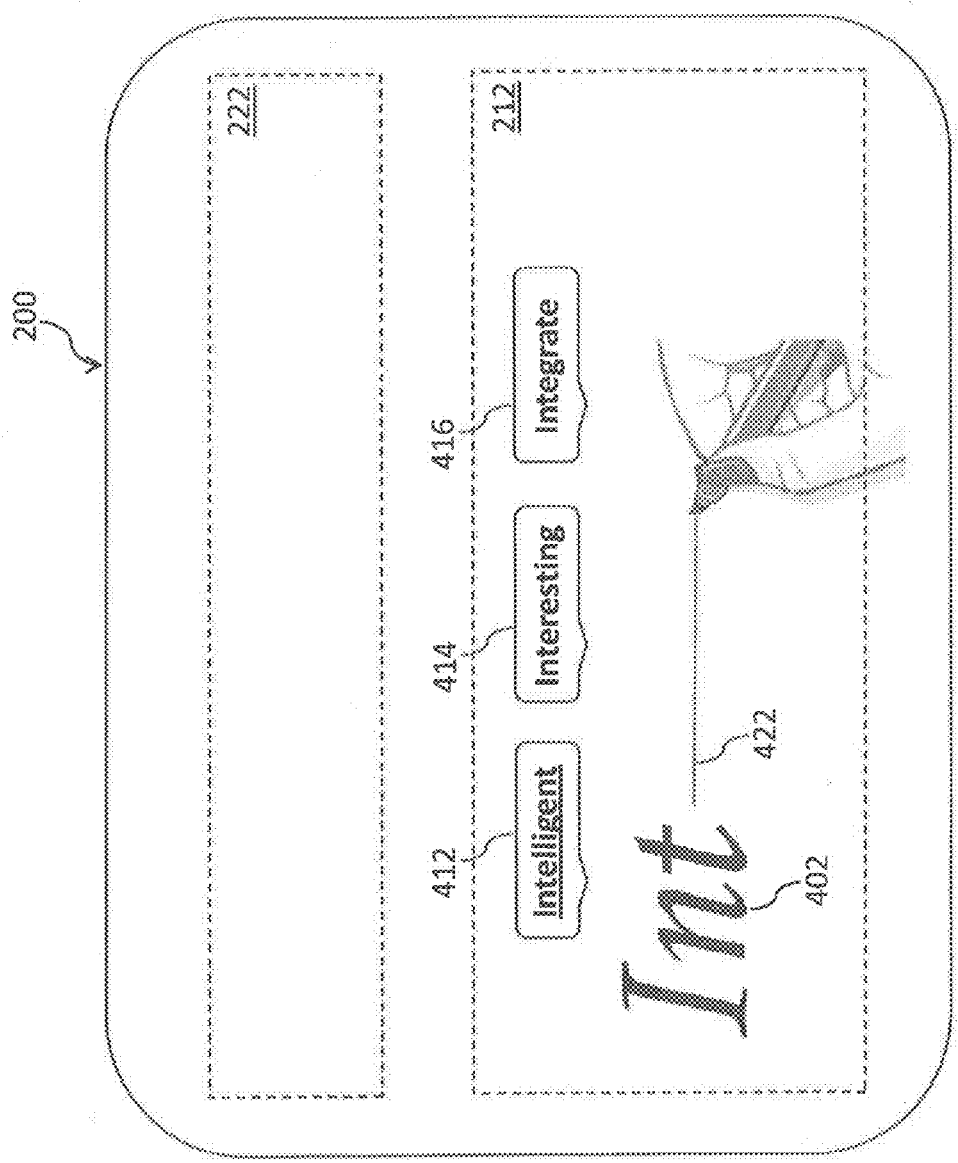

In an additional embodiment, the user can maintain contact between the stylus (or a finger) and a surface of display 112, and can subsequently select the highest-ranked candidate word (i.e., candidate word 412) by entering an additional element of handwritten input within text input region 212. For example, as illustrated in FIG. 4C, the user can maintain contact between the stylus and the surface of touchscreen 118 after entering characters 402, and can draw a line 422 through at least a portion of text entry region 212 to indicate selection of candidate word 412. Processor 102 can receive information indicative of line 422 (i.e., a strikethrough input), and can subsequently generate instructions to display the selection of candidate word 412 (i.e., "Intelligent") within text display region 222, as illustrated in FIG. 4D.

Figure 4D:
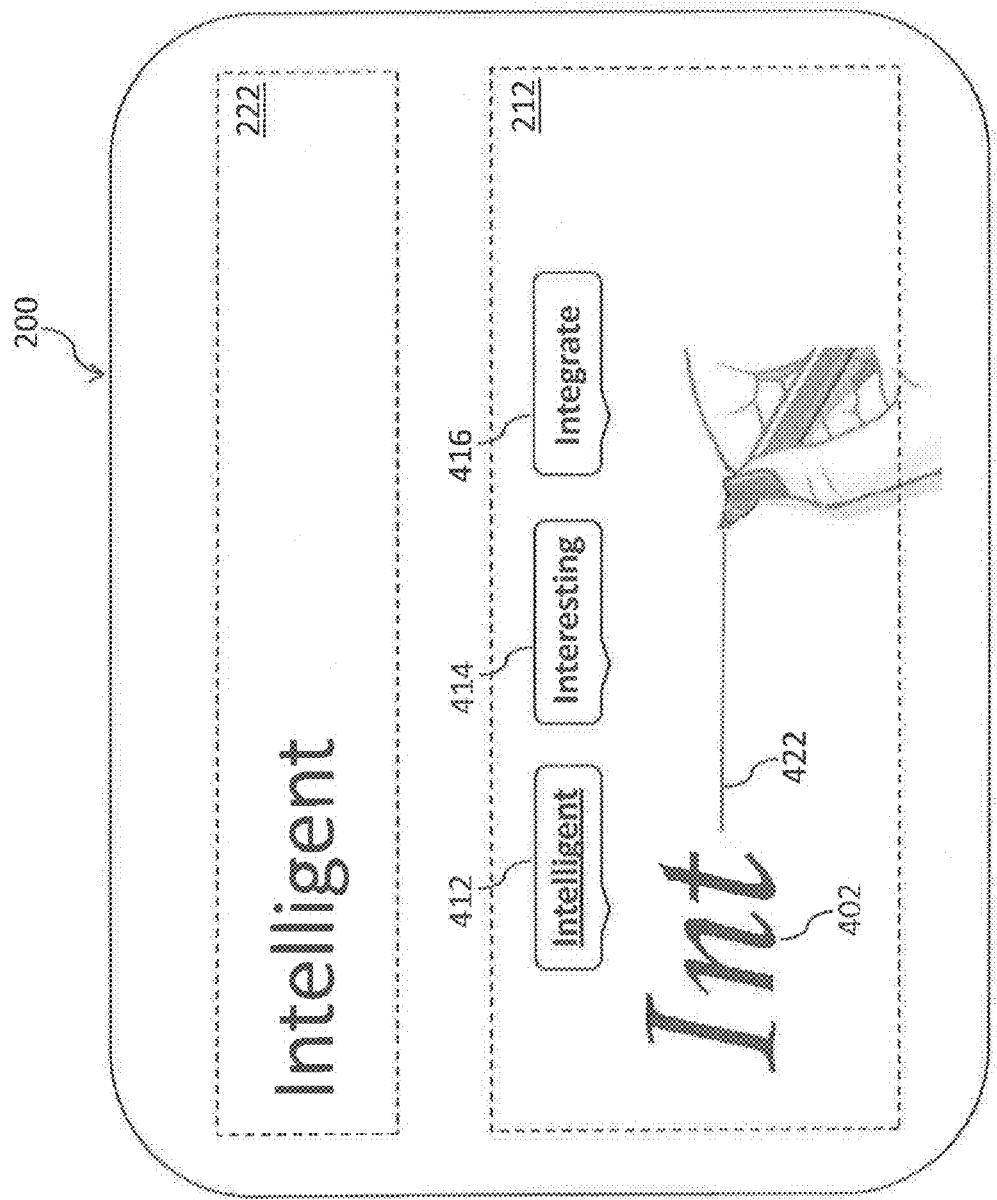

In the example embodiment of FIGS. 4C and 4D, the strikethrough input indicates the user's selection of the displayed candidate word associated with the highest ranking. The disclosed example embodiments are not limited to such inputs, and in additional embodiments, the user can express a selection of a candidate word using other handwritten input, such as a "leaping" input, as illustrated in FIG. 4E.

In FIG. 4E, after entering character 402 and viewing candidate words 412, 414, and 416, the user can break contact between the stylus and the surface of touchscreen 118. The user then establishes contact between the stylus and the surface of touchscreen 118 at a small distance from characters 402 (e.g., two to three millimeters) and outlines a semi-circular shape 432 that "leaps" over a portion of text entry region 212 (i.e., the leaping input). In such embodiments, the leaping input can indicate the user's selection of the highest-ranking candidate word, i.e., candidate word 412. Processor 102 can receive information indicative of the leaping input, and can subsequently generate instructions to display the selection of candidate word 412 (i.e., "Intelligent") within text display region 222, as illustrated in FIG. 4E.

After completing characters 402 using the strikethrough input (e.g., FIG. 4D) or the leaping input (e.g., FIG. 4E), the user can draw additional characters within text input region 212 of GUI 200 using a stylus or a finger. In an embodiment, processor 102 can determine that the additional characters within text entry region 212 that correspond to a new word, and processor 102 can then provide the user with one or more ranked candidate words and facilitate the user's selection of one of the candidate words to complete the additional characters, as described above.

In some embodiments, however, the additional characters correspond not to a new word, but to an additional portion of a previously completed word. For example, after completing a partially entered word using a strikethrough or leaping input, and without breaking contact between the surface of touchscreen 118 and the finger or stylus, the user can draw additional characters into text entry region 212. In such embodiments, processor 102 can append these additional characters to the selected candidate word without an intervening space. Such additional characters can, for example, represent a suffix (e.g., "-ly," "-ing," "-ed," and the like) or a punctuation mark (e.g., a comma or period).

By way of example, in FIG. 4F, a user completes characters 402 by by entering a strikethrough input 422 to select a highest-ranking candidate word 412 (i.e., "Intelligent"). As described above, processor 102 can receive information indicative of strikethrough input 422, and can subsequently generate instructions to display the selection of candidate word 412 (i.e., "Intelligent") within text display region 222.

Figure 4G:
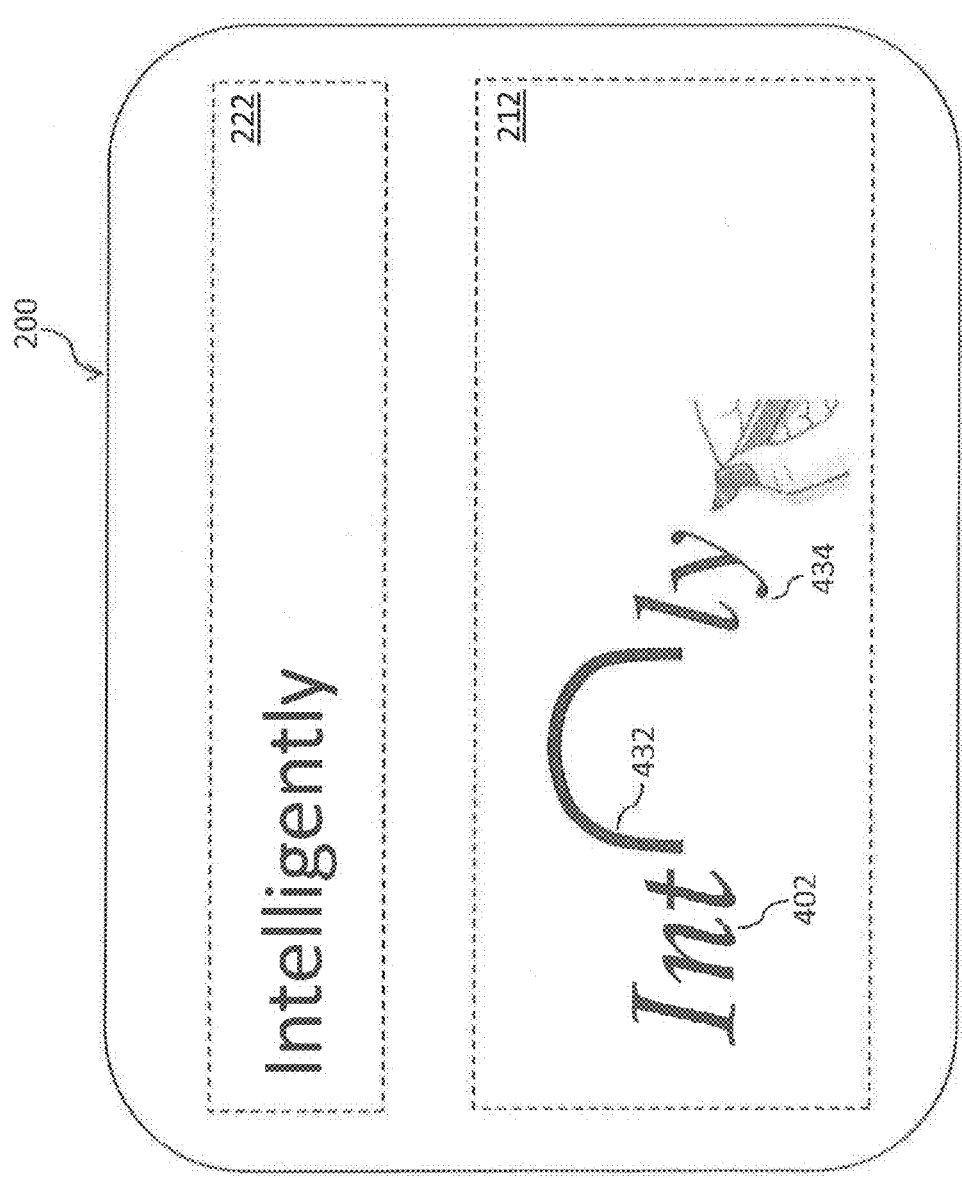

Further, without breaking contact between the stylus and the surface of touchscreen 118, the user can draw additional characters 424 into text entry region 212 in FIG. 4F. As depicted in FIG. 4F, the additional characters 424 include "l-y," which represent a suffix the user wishes appended to the previously completed word "Intelligent." In such an embodiment, processor 102 can append additional characters 424 to the previously completed word without an intervening space. By way of example, processor 102 can append the additional characters "l-y" to previously completed "Intelligent," and the modified word "Intelligently" can be displayed by processor 102 within test display region 222 of GUI 200, as depicted in FIG. 4F Further, by way of example, and as illustrated in FIG. 4G, a user can complete previously entered characters 402 using a leaping input 424, and without breaking contact between the stylus and the surface of touchscreen 118, the user draws into text entry region 212 additional characters 424 corresponding to the suffix "l-y." As described above, processor 102 can append the additional characters "l-y" to previously completed "Intelligent," and the modified word "Intelligently" can be displayed by processor 102 within test display region 222 of GUI 200.

Figure 5B:
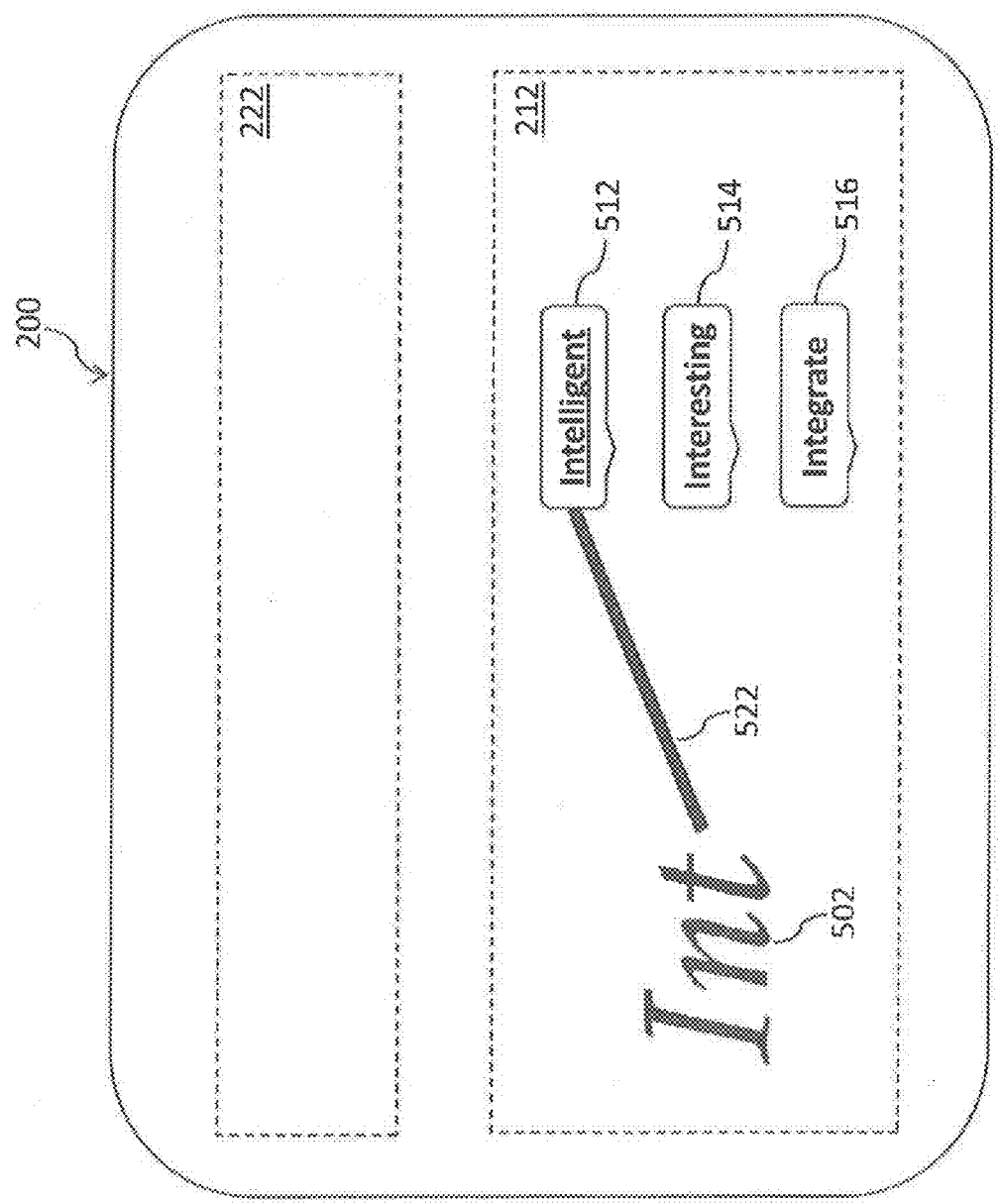
Figure 5C:
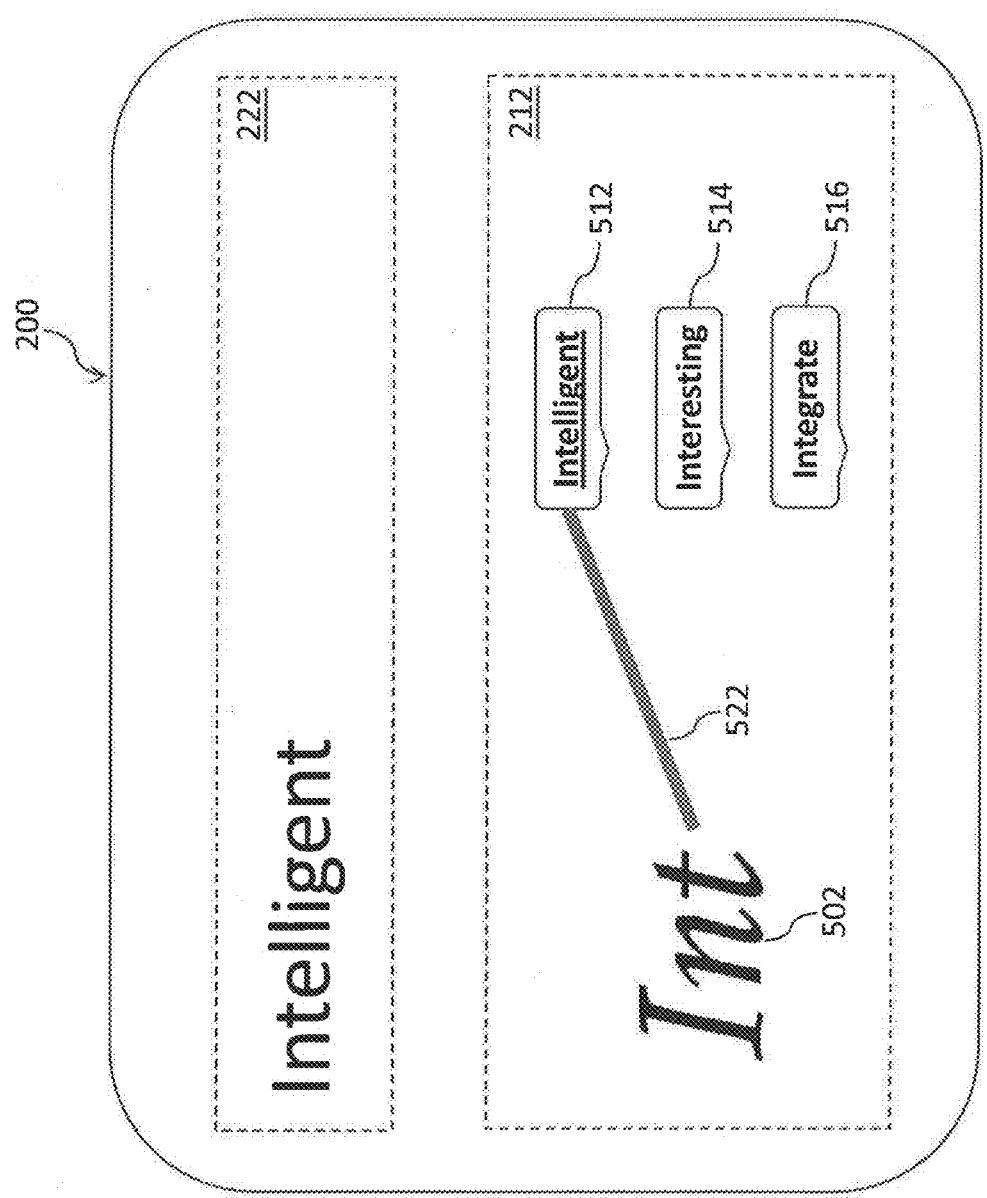

In the example embodiments of FIGS. 4A-4G, processor 102 generates electronic instructions to display a predetermined number of ranked candidate words along a longitudinal axis of a display (e.g., within text entry region 212 of GUI 200). The disclosed example embodiments are not, however, limited to such arrangements and orientations of ranked candidate words within GUI 200. FIGS. 5A-5C illustrate additional orientations of ranked candidate words within the graphical user interface, in accordance with additional example embodiments.

For example, as illustrated in FIG. 5A, a user enters characters 502 into text entry region 212 of GUI 200 using a stylus (or alternatively, a finger). As described above, processor 102 of electronic device 102 receives the handwritten input, identifies a text string corresponding to characters 502, determines that the identified text string includes a threshold number of characters, and then obtains a ranked list of candidate words that correspond to the identified text string.

By way of example, the identified text string include the characters "l-n-t," and processor 102 can obtain candidate words "Intelligent," "Interesting," and "Integrate" that correspond to the identified text string and could represent the user's intended text entry. Processor 102 can then assign rankings to the candidate words (e.g., based on a prior history or use, contextual information, or demographic information). For example, processor 102 can determine that candidate word "intelligent" is associated with a maximum of the rankings assigned to the obtained candidate words. As described above in reference to FIG. 3, processor 102 can display the ranked candidate words within text input region 212 of GUI 200, along with visual indications of the corresponding rankings.

As depicted in FIG. 5A, candidate words 512, 514, and 516 are disposed proximate to character 502 within text entry region 212 of GUI 200. In contrast to the example embodiments of FIGS. 4A-4G, however, candidate words 512, 514, and 516 are arranged in order of their corresponding rankings along a transverse axis of GUI 200, with a ranking assigned to "Intelligent" (i.e., candidate word 512) exceeding a ranking assigned to "Interesting" (i.e., candidate word 514) and a ranking assigned to "Integrate" (i.e., candidate word 516). Further, as illustrated in FIG. 4B, candidate word 512 is highlighted via underlining, indicating that "Intelligent" is associated with a maximum of the assigned rankings.

Upon display of candidate words 512, 514, and 516, the user can select a corresponding one of the displayed candidate words using an additional handwritten input. For example, as illustrated in FIG. 5B, the user can maintain contact between the stylus and the surface of touchscreen 118 and draw a straight line between characters 502 and candidate word 512 to select candidate word 512 (i.e., "Intelligent"). In additional embodiments, the line connecting characters 502 and candidate word 512 can exhibit any magnitude and multiplicity of curvature as long as the line initiates (i.e., contact is made) in a region of GUI 200 associated with characters 502 and terminates (i.e., contact is released) in a region of GUI 200 corresponding to candidate word 512. As described above, processor 102 receives the additional handwritten input, identifies the user's selection of candidate word 512, and then generate instructions to display the selected candidate word, i.e., "Intelligent," within a text display region 222 of GUI 200, as illustrated in FIG. 5C.

Further, although not depicted in FIGS. 5A-5C, the user can also select candidate words 514 and 516 to complete characters 502. For example, the user could draw a line from characters 502 to candidate word 514 to select candidate word 514 to complete characters 502, and further, the user could draw a line from characters 502 to candidate word 516 to select candidate word 516 to complete characters 502.

In the embodiments described above, and in response to handwritten characters entered into a text entry region of a display (e.g., text entry region 212 of GUI 200), processor 102 can present ranked candidate words arranged along a longitudinal axis of GUI 200, or alternatively, arranged along a transverse axis of GUI 200. A user can select one of the candidate words to complete the handwritten characters by entering an additional handwritten input into text entry region 212. Further, after completing the handwritten characters, the user can draw additional characters within text input region 212 of GUI 200 using a stylus or a finger. In an embodiment, processor 102 can determine that the additional characters within text entry region 212 correspond to a new word, and processor 102 can then provide the user with one or more ranked candidate words and facilitate the user's selection of one of the candidate words to complete the entered characters, as described below in reference for FIG. 6.

Figure 6:
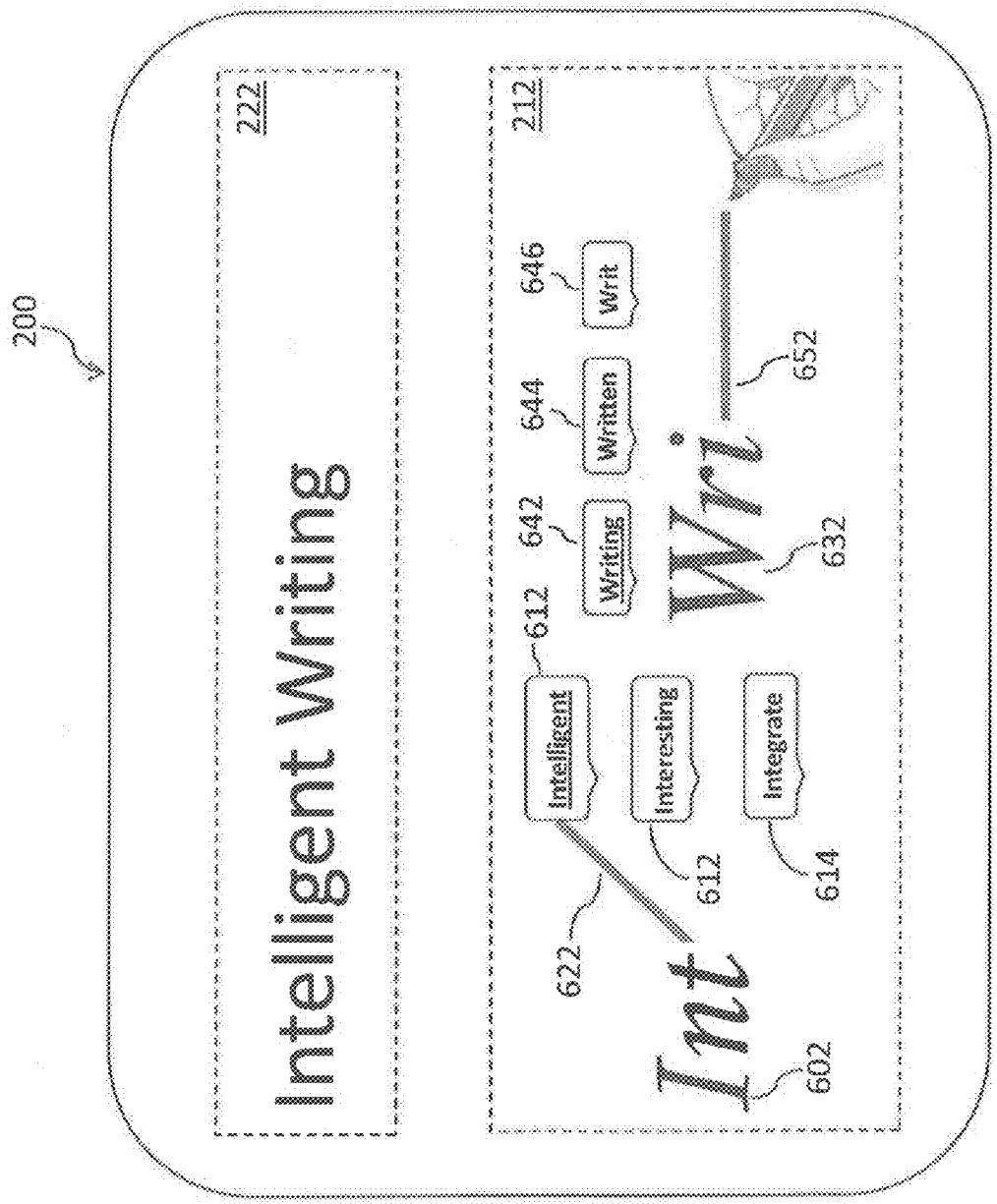
FIG. 6 illustrates an example graphical user interface that provides intelligent predictive input for handwritten text, according to an example embodiment.

In FIG. 6, the user enters characters 602 (i.e., "I-n-t") into text entry region 212 of GUI 200 using a stylus (or alternatively, a finger). As described above, processor 102 of electronic device 102 receives the handwritten input, and obtains and ranks candidate words "Intelligent," "Interesting," and "Integrate" that correspond to the identified text string and could represent the user's intended text entry. As depicted in FIG. 6, candidate words 612, 614, and 616 are disposed proximate to characters 602 within text entry region 212 of GUI 200 and arranged in order of their corresponding rankings along an axis parallel to a transverse axis of GUI 200.

As described above, and while maintaining contact between the stylus and a surface of touchscreen 118 for a predetermined time, the user can trace a line 622 connecting characters 602 and candidate word 612 to indicate selection of candidate word 612. Processor 102 can receive information indicative of connecting line 622, and can subsequently generate instructions to display the selection of candidate word 612 (i.e., "Intelligent") within text display region 222, as illustrated in FIG. 6.

Upon selection of "Intelligent," the user can draw additional characters 632 (i.e., additional characters "W-r-i") within text input region 212. Processor 102 can determine that the additional characters within characters within text entry region 212 represent a new word, and as described above, processor can obtain and rank candidate words "Writing," "Written," and "Writ" that correspond to the could represent the user's intended text entry. As depicted in FIG. 6, candidate words 642, 644, and 646 are disposed proximate to characters 602 and arranged in order of their corresponding rankings along a longitudinal axis of GUI 200.

As illustrated in FIG. 6, the user can enter a strikethrough gesture 652 within text entry region 212 to indicate selection of highest-ranked candidate word 612. Processor 102 can receive information indicative of strikethrough gesture 652, and can subsequently generate instructions to display the selection of candidate word 642 (i.e., "Writing") within text display region 222.

In the example embodiments described above, reference is made to a stylus that contacts a surface of a display of a touchscreen. The disclosed example embodiments are not limited to a stylus, and in additional embodiments, the user can enter characters and other handwritten input into the text entry region of the display using a finger or any additional tool capable of contacting the surface of touchscreen 118 and being recognized by touch-sensitive overlay 114.

Further, in these example embodiments, reference is made to graphical user interfaces (GUIs) that include discrete text entry regions (e.g., text entry region 212 of FIG. 2) and discrete text display regions (e.g., text display region 222 of FIG. 2). The disclosed example embodiments are, however, not limited to such discrete entry and display regions, and in additional embodiments, GUIs consistent with the disclosed embodiments can facilitate an entry of handwritten text and shapes with any additional or alternate region of the GUIs, and can facilitate display of entered text and shapes at any additional or alternate region of the GUIs, without departing from the spirit or scope of the disclosed embodiments.

Embodiments and all of the functional operations described in this specification can be implemented in digital electronic circuitry, or in computer software, firmware, or hardware, including the structures disclosed in this specification and their structural equivalents, or in combinations of them. Embodiments can be implemented as one or more computer program products, i.e., one or more modules of computer program instructions encoded on a computer readable medium, e.g., a machine readable storage device, a machine readable storage medium, a memory device, or a machine readable propagated signal, for execution by, or to control the operation of, data processing apparatus.

The processes and logic flows described in this specification (e.g., FIG. 3) can be performed by one or more programmable processors executing one or more computer programs to perform functions by operating on input data and generating output. The processes and logic flows can also be performed by, and apparatuses can also be implemented as, special purpose logic circuitry, e.g., a field programmable gate array (FPGA) or an application specific integrated circuit (ASIC).

Certain features which, for clarity, are described in this specification in the context of separate embodiments, can also be provided in combination in a single embodiment. Conversely, various features which, for brevity, are described in the context of a single embodiment can also be provided in multiple embodiments separately or in any suitable sub-combination. Moreover, although features can be described above as acting in certain combinations and even initially claimed as such, one or more features from a claimed combination can in some cases be excised from the combination, and the claimed combination can be directed to a subcombination or variation of a subcombination. Additionally, particular embodiments have been described. Other embodiments are within the scope of the following claims.

What is claimed is:

1. A method for an electronic device, comprising:
   receiving, in a text input region of a user interface displayed by the electronic device, a first handwritten input comprising at least one handwritten character;
   obtaining a plurality of candidate words, the candidate words being associated with the at least one handwritten character;

generating a first instruction to display information identifying one or more of the candidate words in a text display region of the user interface displayed by the electronic device, the text display region being separated from the text input region;

receiving, in the text input region, a second handwritten input comprising a handwritten geometric shape indicative of a selection of one of the displayed candidate words; and in response to receiving the second handwritten input comprising a handwritten geometric shape in the text input region, generating a second instruction to display the selected candidate word in the text display region of the user interface displayed by the electronic device.

2. The method of claim 1, further comprising:
identifying, based on the first handwritten input, a text string corresponding to the at least one handwritten character;
determining whether the text string includes a threshold number of characters; and
obtaining the candidate words when the text includes the threshold number of characters.

3. The method of claim 2, wherein at least one of the candidate words includes the identified text string.

4. The method of claim 1, further comprising assigning rankings to the obtained candidate words based on at least one of usage data, contextual information, or demographic information.

5. The method of claim 4, further comprising generating a third instruction to display, on the display of the electronic device, information identifying the rankings assigned to the one or more candidate words.

6. The method of claim 4, further comprising:
identifying the candidate word associated with a maximum of the assigned rankings; and
generating a third electronic instruction to display, on the display of the electronic device, information that visually highlights the identified candidate word.

7. The method of claim 4, further comprising:
determining whether the second handwritten input comprises at least one of a strikethrough input or a leaping input; and
identifying the candidate word associated with a maximum of the rankings as the selected candidate word, when the second handwritten input includes at least one of the strikethrough input or the leaping input.

8. The method of claim 1, further comprising generating a third electronic instruction to display, within a first portion of the display, information identifying the one or more handwritten characters.

9. The method of claim 7, wherein:
the second handwritten input comprises a handwritten line connecting the one or more handwritten characters with the information identifying a corresponding one of the candidate words; and
the method further comprises identifying the corresponding candidate word as the selected candidate word.

10. The method of claim 1, further comprising generating a third electronic instruction to display the information identifying a subset of the candidate words within a first portion of the display and along at least one of a longitudinal axis of the display or a transverse axis of the display.

11. The method of claim 1, further comprising:
after displaying the selected candidate word in the text display region, receiving, in the text input region, a third handwritten input comprising one or more additional handwritten characters following the second handwritten input comprising the handwritten geometric shape; and generating a third electronic instruction to append the additional handwritten characters to the selected candidate word in the text display region.

12. An electronic device comprising:
a display;
a memory storing one or more instructions; and
a processor configured to execute the one or more instructions to perform operations comprising:
receiving, in a text input region of a user interface displayed on the display of the electronic device, a first handwritten input comprising at least one handwritten character;
obtaining a plurality of candidate words, the candidate words being associated with the at least one handwritten character;
generating a first instruction to display information identifying one or more of the candidate words in a text display region of the user interface displayed on the display of the electronic device, the text display region being separated from the text input region;
receiving, in the text input region, a second handwritten input comprising a handwritten geometric shape indicative of a selection of one of the displayed candidate words; and
in response to receiving the second handwritten input comprising a handwritten geometric shape in the text input region, generating a second instruction to display the selected candidate word in the text display region of the user interface displayed on the display the electronic device.

13. The electronic device of claim 12, wherein the processor is configured to execute the one or more instructions to further perform:
identifying, based on the first handwritten input, a text string corresponding to the at least one handwritten character;
determining whether the text string includes a threshold number of characters; and
obtaining the candidate words when the text includes the threshold number of characters.

14. The electronic device of claim 12, wherein the processor is configured to execute the one or more instructions to further perform assigning rankings to the obtained candidate words based on at least one of usage data, contextual information, or demographic information.

15. The electronic device of claim 14, wherein the processor is configured to execute the one or more instructions to further perform generating a third instruction to display, on the display of the electronic device, information identifying the rankings assigned to the one or more candidate words.

16. The electronic device of claim 14, wherein the processor is configured to execute the one or more instructions to further perform:
identifying the candidate word associated with a maximum of the assigned rankings; and
generating a third electronic instruction to display, on the display of the electronic device, information that visually highlights the identified candidate word.

17. The electronic device of claim 16, wherein the processor is configured to execute the one or more instructions to further perform:
determining whether the second handwritten input comprises at least one of a strikethrough input or a leaping input; and identifying the candidate word associated with a maximum of the rankings as the selected candidate word, when the second handwritten input includes at least one of the strikethrough input or the leaping input.

18. The electronic device of claim 12, wherein:

the processor is configured to execute the one or more instructions to further perform displaying, within a first portion of the display, information identifying the one or more handwritten characters;

the second handwritten input comprises a handwritten line connecting the one or more handwritten characters with the information identifying a corresponding one of the candidate words; and the processor is configured to execute the one or more instructions to further perform identifying the corresponding candidate word as the selected candidate word.

19. The electronic device of claim 12, wherein the processor is configured to execute the one or more instructions to further perform displaying, within the display, the information identifying a subset of the candidate words within a first portion of the display and along at least one of a longitudinal axis of the display or a transverse axis of the display.

20. The electronic device of claim 12, wherein the processor is configured to execute the one or more instructions to further perform:

after displaying the selected candidate word in the text display region, receiving, in the text input region, a third handwritten input comprising one or more additional handwritten characters following the second handwritten input comprising the handwritten geometric shape; and generating a third electronic instruction to append the additional handwritten characters to the selected candidate word in the text display region.

21. The method of claim 7, wherein the strikethrough input or the leaping input is in line with the first handwritten input comprising the at least one handwritten character in the text input region.

* * * * *